Sept. 6, 1966 P. F. BORTH 3,271,282

PROCESS FOR ETCHING PHOTO-ENGRAVING COPPER

Filed June 18, 1963

INVENTOR.
PAUL F. BORTH

BY Blum, Moscovitz, Friedman, Blum & Kaplan
ATTORNEYS

United States Patent Office 3,271,282

Patented Sept. 6, 1966

3,271,282

PROCESS FOR ETCHING PHOTO-ENGRAVING COPPER

Paul F. Borth, Park Forest, Ill., assignor to Photo-Engravers Research, Inc., Savannah, Ga., a corporation of Georgia Filed June 18, 1963, Ser. No. 288,802
10 Claims. (Cl. 204—143)

Figure 1:
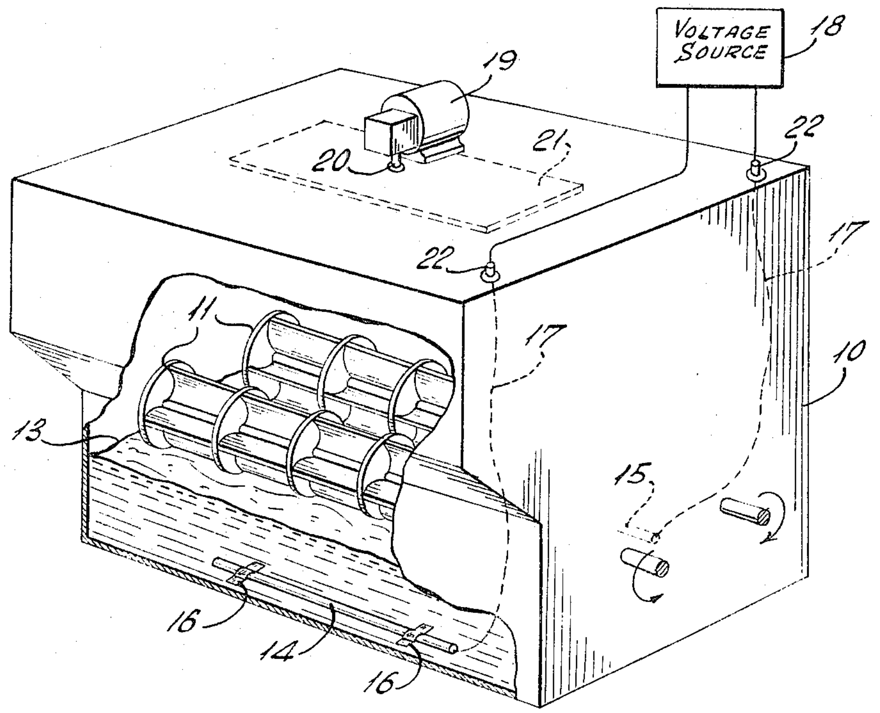

The present invention is concerned with the etching of metals and particularly the etching of copper plates by the use of powderless etching techniques. More particularly, it deals with improving the effectiveness of passivating agents in ferric chloride etching baths by impressing a voltage differential across said bath.

The process of making a relief printing surface on photo-engraving copper or copper alloy plates is now well known in the art. Basically, the procedure involves coating the copper plate with a light sensitive enamel and thereafter exposing the plate through a photographic negative having transparent lines, etc., conforming to the desired image. The exposed area of the coating, which is referred to as a resist, adheres to the surface of the metal while the area of the coating not struck by light is easily removed therefrom upon being placed in an etching bath. The etching bath is conventionally a ferric chloride containing etching solution.

Heretofore one of the problems encountered during the etching procedure has been sidewall etching and undercutting. As the depth of the etch increases the sides of the metal supporting the resist are exposed to etching solution, tending to undercut the resist along the side wall edges and often resulting in a printing surface which is not a true representation of the image transferred to the sensitized metal. Recently, means have been taught for protecting the plate from such undercutting by incorporating various passivating agents in the iron chloride etching bath. These agents serve to diminish undercutting by forming an etch resistant film on the surface of the plate, thereby giving a protective film on the sidewalls of the resist, and protecting same from further etching. However, in order to continue the etching process, it is necessary to remove the film from the bottom portions of the area to be further etched in a manner so as to not remove the film from the sidewall areas to be protected. Conventionally this film removal is accomplished by some form of mechanical action such as splashing of the etching solution against the plate, a brushing action, or force flow of the solution against the plate.

More specifically, the following chemicals have been taught to be useful as passivating agents for ferric chloride etching baths. These compounds and their use are disclosed in detail in the patents indicated which are herein incorporated by reference.

(1) Formamidine disulfide, salts of formamidine disulfide, and salts of substituted formamidine disulfide as taught in U.S. Patent 3,033,725, issued May 8, 1962, to Daugherty et al. Particularly preferred is formamidine disulfide hydrochloride, although other salts of formamidine disulfide such as formamidine disulfide hydroiodide and formamidine disulfide picrate can be employed. Also suitable are salts of a disulfide of a substituted formamidine in which one or more hydrogen atoms of the formamidine group are substituted by an alkyl group or an aryl group, such as diphenyl, dibutyl, diisopropyl, etc. The term "formamidine disulfide compound" denotes all the above compounds. In general, the bath will include ferric chloride in a range of about 200 to 460 grams per liter of the bath and a formamidine disulfide compound in a concentration of 0.6 to 3 grams per liter.

(2) Alkyl amine compounds and alkanol amine compounds in combination with the formamidine disulfide compounds noted above, as is described in U.S. Patent 3,033,793, issued May 8, 1962, to Bradley et al. In general from about 0.005 milliliter to 10 milliliters, preferably 3 to 6 milliliters of the amine compound are added per liter of bath. Particularly preferred for best results are mixed isopropyl amines. However, good results have been obtained with monoethanolamine, diethanolamine, di-n-butyl amine, octyl amine acetate, etc. Other amines, such as disclosed in U.S. Patent No. 3,033,793, which may be utilized in this invention include cetyl amine acetate, lauryl amino propylamine and diethylaminopropyl amine when employed at somewhat lower levels than described above. Satisfactory results have been obtained using monoisopropanol amine, alpha methylbenzyl-dimethyl amine, triethanol amine, methyldiethanol amine, monoethanol amine, diethanolamine, mixed isopropanol amine, octyl amine acetate, decyl amine (Armeen 10D),[1] "Arquad 12–50,"[2] triisopropanol amine, di-n-butyl amine, triethyl amine, isopropyl amine, 2-amino butanol, 2-amino-2-ethyl-1,3-propanediol, alpha picoline, cyclohexyl amine, N-(2-hydroxypropyl)-ethylene diamine.

While the use of the above passivating agents in combination with an iron chloride etching bath has represented a significant step forward in the art, one problem encountered in the use of such baths has been the reduced effectiveness of the passivating agents over the passage of time, particularly if the bath has stood unused for some time. The reduced effectiveness of the film-forming additive often will require rebalancing of the baths by addition of additional passivating agents so as to maintain its effective concentration. Naturally, this of course reduces production efficiency and represents a dislocation in the continuous operation desired for commercial reasons.

It has now been found that the effectiveness of iron chloride etching baths containing one or more of the above denoted passivating agents can be substantially enhanced by impressing a voltage differential across the etching bath, preferably during the period when the etching solution is being contacted with the copper or copper alloy plate. It has been found that when current is passed through the bath, the effective concentration of the passivating agent is maintained for longer periods of time than realized with conventional baths. While this is not entirely understood, it is believed that the electric current or potential results in a reversal of the normal decomposition reaction of the passivating agents, thus maintaining the concentration of these agents at a high level over a greater period of time. As indicative of the unique nature of the present invention, impressing either an A.C. or D.C. voltage across a ferric chloride etching bath containing thiourea as the passivating agent gives no improvement.

The amount of current passing through the bath depends on voltage, bath volume, agitation and amount of dissolved copper, and generally ranges from 1 to 5 amps. The voltage differential can be impressed from either an A.C. or D.C. power source. When employing an A.C. source, voltage levels in the range of 3 to 50, preferably 5 to 20 and especially 6 to 12 volts can be employed (this corresponding to an amperage of about 1 to 5, preferably approximately 2 to 3 amps). A 60 cyle alternating current is conveniently utilized. Normally the A.C. voltage source operates in conjunction with one or more transformers to reduce the voltage to the indicated levels.

Preferably, a D.C. voltage source is employed. In general, when employing a D.C. source a potential difference of about 3 to 50, preferably 4 to 12 and especially

[1] "Armeen" is the trade name for a series of amines derived from fatty acids.
[2] "Arquad" is the trade name for a series of alkyl trimethylammonium chloride compounds.

about 6 volts is employed, this corresponding to amperages in the range of about 1 to 5 amps.

Electrodes are placed in the etching bath, preferably along the base thereof. The electrodes are chosen so as to not interfere with the normal etching action of the bath, carbon electrodes being especially suitable in view of their relatively inert nature. Alternatively platinum or titanium electrodes can be employed. The electrodes are naturally attached to the source of voltage potential difference by suitable electrical leads.

The unique apparatus of the present invention wherein the electrodes are placed in apparatus for contacting copper plate with an etching bath is shown in the attached drawings and will be further described hereafter.

FIGURE 1 of the drawings shows a partly cut away side view of an etching machine of the present invention characterized by the use of electrodes positioned in the lower portion of the container.

Figure 2:
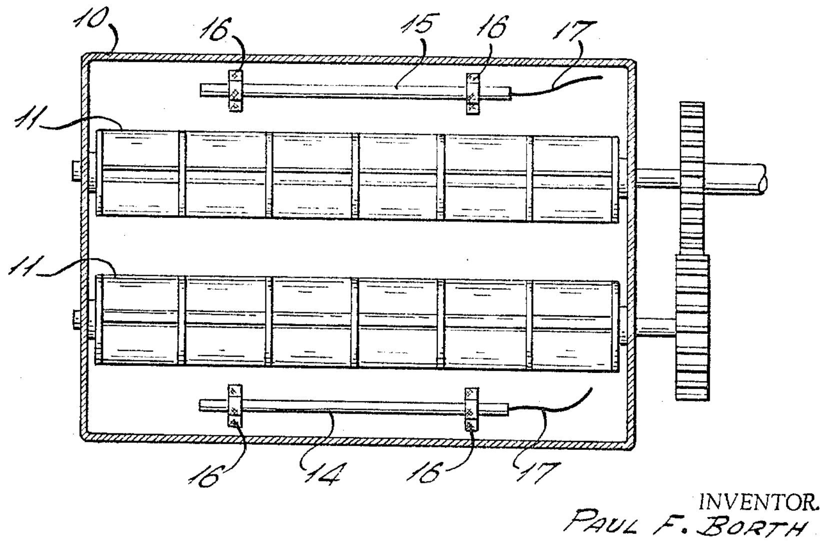

FIGURE 2 shows a top view of the machine tank of FIGURE 1.

The various aspects and modifications of the present invention will be made more clearly apparent by reference to the following description, examples and accompanying drawings.

As indicated previously, the etching solutions will contain the conventional amounts of ferric chloride and passivating agents as indicated above. The specific gravity of the aqueous solution of ferric chloride in distilled water may be in the range of 20° Baumé to 48° Baumé which corresponds to adding anhydrous ferric chloride in the range of about 200 to 460 grams per liter of water.

Turning specifically to FIGURES 1 and 2, shown therein is an etching machine characterized by the presence of electrodes in the area of the machine occupied by the etching bath solution.

Machine 10 will contain in its lower portion the etching bath solution up to liquid level 13.

As is conventional, the etching bath is impinged or splashed upon the copper surface by means of one or more rotating paddle wheels 11 whose circular periphery is provided with diametrically opposed pairs of planar paddles or blades 12, which are preferentially rectangular in shape. Paddle wheel 11 is rotated about a horizontal axis and it may be provided with a guard to cause it to take up liquid from the lower portion of the bath and to impinge or splash the liquid in a substantially single direction against the copper plate. In the drawing the configuration is such that this direction is vertically upward, the planar copper plate surface being held in a horizontal plane close to and above the uppermost non-immersed blades. When the copper plate surface is held in a vertical plane close to the non-immersed blades, this direction will be horizontal. Typically, the paddle wheel may be rotated at 400 to 500 revolutions per minute and the diametral distance between the outer edges of each pair of diametrically opposed blades can be 7 to 8 inches. Each of the adjacent blades 12 form a pocket which picks up a batch of the etching bath and propels the batch in the selected direction against the cooper surface by means of centrifugal force.

Copper plate 21 is conveniently held in a horizontal position faced downward above the rotary paddle wheels 11 by means of plate holding retaining means or shaft 20. The retaining means is preferentially provided with an electric motor 19 which allows the position of the copper plate being etched to be altered simply by imparting a rotational movement to the shaft 20.

Thus, an etching bath which contains ferric chloride and one or more of the aforedescribed passivating agents is contained in the lower portion of etching machine 10, paddles 11 picking up portions of the etching bath during their rotation and thereafter propelling the etching solution by centrifugal force against the exposed surface of copper plate 21. Plate 21 has previously been subjected to conventional coating with light sensitive enamel and exposure through a photographic negative to impart the desired lines of resist corresponding to the image of the photographic negative.

Since the jet or stream of etching bath is propelled perpendicular to the surface of the copper which is to be etched, or in a direction which is substantially perpendicular thereto, the stream propulsion exerts a gentle but sufficient scrubbing or mechanical action to keep the bottom face of the etched depression either free, or substantially free, from the passivating film so as to permit additional desired etching action at the bottom face. However, there is little or no removal of the passivating film from the sidewalls of the depression, since the etching solution is directed parallel to this surface while splashing perpendicularly along the face of the plate to be further etched.

In accordance with the present invention, a plurality of electrodes 14 and 15 are positioned in machine 10 at a point so as to be in contact with the etching bath solution 13. The electrodes are advantageously positioned along the base of the etching machine 10, preferably straddling the position of the rotating paddle wheels as is more clearly shown in FIGURE 2. Electrodes 14 and 15 may be made of any material which does not chemically interact with the constituents of the etching bath, carbon electrodes normally being preferred. Means for fastening the electrodes in the etching machine are indicated by numeral 16, with either permanent or temporary fastening means being suitable.

Electrical leads 17 are provided for communicating electrodes 14 and 15 to a power supply source which is schematically indicated by numeral 18, the power source conveniently being put in contact via posts 22. As noted previously, the power source may be either an A.C. or D.C. line. Sufficient voltage differential is impressed across the electrodes to give the desired current flow within the etching bath, e.g., in the case of a D.C. voltage source a voltage differential of 5 to 10 volts is sufficient for this purpose. The voltage potential has been found to increase the effective life of the passivating agents within the etching bath and thus allow them to be used for longer periods of time while providing the requisite film protection against etching of the sidewalls.

When an A.C. power supply is employed, one or more transformers may be employed to reduce the voltage of the A.C. source, which typically may be a 115 volt line. Thus the 115 volts can be reduced by incorporating an isolation transformer and a filament transformer in the line connecting the A.C. power supply to the electrodes.

While the present invention is particularly suitable for modifying an etching machine containing rotating paddle wheels, other devices employed in powderless etching can be modified by placing a plurality of electrodes in contact with the etching bath. Thus, the present invention may take the form of an etching device wherein nozzles are provided for injecting etching bath solution against the surface of the plate to be etched while simultaneously providing electrodes in contact with the etching bath reservoir solution. Similarly, electrodes may be provided in an apparatus characterized by the use of bristle brushes or the like to agitate the etching bath solution while simultaneously brushing across the surface of the copper plate to be etched. Numerous other conventional devices for contacting the plate with the etching bath solution may be modified by the use of electrodes in the etching bath reservoir, and such devices are to be construed as being within the scope of the present invention.

The following sets forth several experimental tests performed by the use of an etching machine such as is illustrated in FIGURES 1 and 2 of the drawings.

*Example 1*

A test was run in the apparatus depicted in FIGURE 1. Two carbon rods ½ inch x 8 inches were placed 24 inches apart in the bottom of the etching machine tank. The etching machine tank was basically a Master PC–32 etching machine, which was modified in accordance with the present invention. The carbon rods were positioned at the base of the tank straddling the paddle wheels, the rods being fastened to the tank by means of vinyl adhesive tape. Insulated copper wires were attached to the rods and the points of attachment protected by several layers of vinyl tape. Copper wires in turn were connected to a suitable source of voltage potential.

An etching bath composition typical of that suitable for the practice of the present invention was prepared. The etching bath was a 30° Baumé ferric chloride etching solution containing two grams per liter of ammonium persulfate, 2.4 grams per liter of formamidine disulfide and 5 ccs. per liter of mixed isopropanol amines. The ammonium persulfate is conventionally used as an additive to the bath which functions to permit re-use of the bath, with suitable additions of formamidine disulfide, for a second day's use. It does not enter into reaction, but merely provides increased oxidation potential. As noted previously the formamidine disulfide serves as a passivating agent for the ferric chloride etching bath.

A work specimen containing dot images was produced in the conventional manner by coating a plate of photo-engraving copper with conventional light sensitive enamel and then exposing same through a photographic negative having transparent lines of a dot image. After exposure, the plate was developed, thereby producing dots of resist corresponding to the dot image of the photographic negative, the remaining portion of the plate being bare metal.

Each specimen was then subjected to contact with the aforesaid etching bath. The etching bath was splashed upwardly against the work specimen by means of the rotary paddle as shown in FIGURES 1 and 2, the rotation of the paddle in each example being about 540 r.p.m. The plate was 6 inches above the paddle wheel periphery.

In the first example, the leads from the electrodes were fastened from a D.C. power supply so as to impress a 6 volt potential across the etching bath (this corresponding to a very low amperage value). Test plates were etched in this bath at half hour intervals while current was passing through the bath. Etching time in each case was 2½ minutes.

A plate etched in this manner showed the protective effect of the passivating additives sufficient to prevent etching away a half tone dot having a 0.0009 inch diameter. Upon continuing the etching after an additional period of 5½ hours while impressing the same voltage across the bath, a dot of 0.0015 inch diameter was held.

Thus, good retention of the resist was obtained without substantial undercutting.

As a control, the above described bath (a fresh sample thereof) was employed to etch a similarly treated photo-engraving copper plate without passing a voltage across the etching bath. All other conditions were the same as described previously. In this control test a 0.0009 inch diameter dot was initially held. However, after a period of about 5 hours the bath was effective in holding only a 0.0035 inch diameter dot.

As is thus seen by the above test, the etching bath across which a potential difference was impressed was considerably more effective in providing protection of the resist lines than was the same bath across which no potential had been impressed.

*Example 2*

The same procedure, bath, apparatus, etc., as described in Example 1 was employed. A fresh bath of the ferric chloride etching bath containing the aforesaid passivating agents was utilized. In this case, however, an alternating current (60 cycles) was applied across the electrodes. By use of a combination of an isolation transformer and a 10 volt filament transformer, a 115 volt A.C. power supply was reduced to provide a potential difference of 8 to 10 volts across the bath (corresponding to about 2 amps). The test described in Example 1 was repeated and it was found that the decomposition of the passivating agent was prevented and its effectiveness in terms of protecting the resist from undercutting, etc., was enhanced. Specifically, after a period of 0 hour a dot of .0009 inch initial diameter was held, while after an additional period of 5½ hours, a dot of .0038 inch initial diameter was maintained.

Various modifications may be made to the present invention. While it is particularly desirable to impress a voltage potential across an etching bath while splashing it against the engraving plate by means of paddle wheel rotation, the potential difference may be employed in combination with any means for causing relative movement between the etching bath and the copper plate so as to provide sufficient mechanical action to remove the protective film from the portions of the plate which are to undergo further etching. Thus the electrodes may be placed in the same unit in which actual contact between the etching bath and the photo-engraving plate is effected, or in an integrated unit which contains a reservoir of the etching solution which is then contacted with the copper plate to be etched.

Having described the present invention that which is sought to be protected is set forth in the following claims.

I claim:

1. In a process for etching photo-engraving copper by contacting said copper with an aqueous ferric chloride solution containing a formamidine disulfide passivating agent, the improvement which comprises impressing a potential difference of from about 3 to about 50 volts across the etching bath so as to enhance the effectiveness of the passivating agents.

2. The process of claim 1 wherein said potential difference is impressed across said etching bath while causing some form of mechanical action to take place upon contact of the etching solution with the photo-engraving copper.

3. The improvement of claim 1 wherein an electric potential is impressed across said etching bath while splashing said etching solution against the surface of the photo-engraving copper.

4. In a process for etching a photo-engraving copper having a portion of its surface masked with a resistant coating, wherein the etching is effected by contacting the photo-engraving copper with an aqueous ferric chloride etching solution containing a passivating agent selected from the group consisting of (1) formamidine disulfide compounds, and (2) amine compounds selected from the group consisting of alkyl amines and alkanol amines in combination with formamidine disulfide compounds, the improvement which comprises impressing a voltage differential of from about 3 to about 50 volts across the etching bath while contacting the photo-engraving copper with the etching solution.

5. The improvement of claim 4 wherein the electrical potential is impressed across the etching solution while causing the etching solution to impinge on the surface of said photo-engraving copper.

6. The improvement of claim 4 wherein an A.C. voltage source is employed and a voltage potential difference of 5 to 20 volts is impressed across said solution.

7. The improvement of claim 4 wherein a D.C. voltage source is employed and a voltage difference of 4 to 12 volts is impressed across said solution.

8. An improved process for etching a photo-engraving copper plate having a portion of its surface masked with a resistant coating which comprises maintaining a reservoir of etching solution comprising ferric chloride and a passivating agent selected from the group consisting of (1) formamidine disulfide compounds, and (2) amine compounds selected from the group consisting of alkyl amines and alkanol amines in combination with formamidine disulfide compounds (1), impressing a voltage potential of from about 3 to about 50 volts across said reservoir while simultaneously propelling etching solution against the face of said photo-engraving copper.

9. The process of claim 8 wherein a D.C. voltage source is employed and a potential difference of 4 to 12 volts impressed across said etching solution reservoir.

10. The process of claim 8 wherein an A.C. voltage is impressed across said etching bath reservoir, the voltage impressed ranging from 6 to 12 volts.

References Cited by the Examiner

UNITED STATES PATENTS

| | | | |
|---|---|---|---|
| 2,891,897 | 6/1959 | Zetzsche | 204—273 |
| 2,997,438 | 8/1961 | James et al. | 204—273 |
| 3,013,956 | 12/1961 | Hugle et al. | 204—143 |
| 3,033,725 | 5/1962 | Daugherty et al. | 252—79.4 |
| 3,033,793 | 5/1962 | Bradley et al. | 252—79.4 |
| 3,139,394 | 6/1964 | Oelgoetz | 204—143 |

JOHN H. MACK, *Primary Examiner.*

ROBERT K. MIHALEK, *Examiner.*